United States Patent
Franco de Oliveira Falcão et al.

(10) Patent No.: US 9,371,815 B2
(45) Date of Patent: Jun. 21, 2016

(54) TURBINE WITH RADIAL INLET AND OUTLET ROTOR FOR USE IN BIDIRECTIONAL FLOWS

(75) Inventors: António Franco de Oliveira Falcão, Lisboa (PT); Luis Manuel de Carvalho Gato, Rua Alto da Bonita (PT)

(73) Assignee: INSTITUTO SUPERIOR TECNICO, Lisboa (PT)

( * ) Notice: Subject to any disclaimer, the term of this patent is extended or adjusted under 35 U.S.C. 154(b) by 809 days.

(21) Appl. No.: 13/580,099

(22) PCT Filed: Feb. 15, 2011

(86) PCT No.: PCT/PT2011/000003
§ 371 (c)(1),
(2), (4) Date: Aug. 20, 2012

(87) PCT Pub. No.: WO2011/102746
PCT Pub. Date: Aug. 25, 2011

(65) Prior Publication Data
US 2013/0011251 A1 Jan. 10, 2013

(30) Foreign Application Priority Data
Feb. 19, 2010 (PT) ........................................ 104972

(51) Int. Cl.
*F03B 3/12* (2006.01)
*F03B 3/18* (2006.01)
(Continued)

(52) U.S. Cl.
CPC ... *F03B 3/12* (2013.01); *F03B 3/18* (2013.01); *F03B 13/142* (2013.01); *F03B 13/22* (2013.01);
(Continued)

(58) Field of Classification Search
CPC .............. F03B 3/12; F03B 3/18; F03B 3/183; F03B 13/12; F03B 13/14; F03B 13/142; F03B 13/22; F03B 13/26; F03B 13/264; F03B 17/062; F03B 17/063; F03B 17/065; F05B 2210/404; Y02E 10/38; Y02E 10/223
See application file for complete search history.

(56) References Cited

U.S. PATENT DOCUMENTS 557,802 A * 4/1896 Haag ........................ F03B 3/00
 192/113.1
1,357,440 A * 11/1920 Britcher ........................ 251/298
(Continued)

FOREIGN PATENT DOCUMENTS

GB 1500400 A * 2/1978
JP 2064270 3/1990
(Continued)

OTHER PUBLICATIONS

International Search Report for International Application No. PCT/PT2011/000003 mailed Nov. 22, 2011.

*Primary Examiner* — Craig Kim
*Assistant Examiner* — Wayne A Lambert
(74) *Attorney, Agent, or Firm* — Pearl Cohen Zedek Latzer Baratz LLP

(57) ABSTRACT

The present invention relates to a turbine which can absorb energy from bi-directional reversing flows, as is the case of ocean wave energy converters. In the periphery of the bladed rotor (2) of the turbine there are two openings (5, 6) through which the fluid alternately enters, or exits from, the rotor, the outward flow being radially centrifugal and the inward flow being radially centripetal. The turbine stator comprises two sets of guide vanes (7, 8) for alternately directing the bi-directional reversing flow to, and from, the rotor, and two ducts (9, 12) disposed between the rotor and the guide vanes and extending radially beyond the guide vanes. Two stator arrangements are considered. In both arrangements, the inlet guide vanes deflect the inward flow and impart a circumferential swirl component in the same direction as the normal rotational direction of the rotor. In one of the arrangements, the twin guide vane set (18, 19) is close to the rotor periphery (5, 6) and can be moved axially so that it guides the inward flow into the rotor and does not intersect the outward flow. In the other arrangement, both sets of guide vanes (7, 8) are axially fixed and are radially offset from the rotor.

12 Claims, 7 Drawing Sheets

(51) Int. Cl.
*F03B 13/22* (2006.01)
*F03B 13/14* (2006.01)

(52) U.S. Cl.
CPC .......... *F05B 2210/404* (2013.01); *Y02E 10/223* (2013.01); *Y02E 10/32* (2013.01); *Y02E 10/38* (2013.01)

(56) References Cited

U.S. PATENT DOCUMENTS

| | | | | |
|---|---|---|---|---|
| 1,478,054 | A | * | 12/1923 | Overn, Jr. .................... 415/161 |
| 1,509,587 | A | * | 9/1924 | Cole ............................... 415/45 |
| 1,587,608 | A | * | 6/1926 | Siegler ......................... 416/179 |
| 1,900,144 | A | * | 3/1933 | White ........................... 415/184 |
| 2,484,554 | A | * | 10/1949 | Concordia et al. ........... 416/188 |
| 3,210,045 | A | * | 10/1965 | Lindquist ..................... 415/164 |
| 3,236,497 | A | * | 2/1966 | Wycliffe ......................... 415/42 |
| 3,236,498 | A | * | 2/1966 | Kerensky ........................ 290/43 |
| 3,360,241 | A | * | 12/1967 | Lindquist ..................... 415/160 |
| 4,271,668 | A | * | 6/1981 | McCormick ................... 60/398 |
| 4,533,292 | A | * | 8/1985 | Sugihara et al. ........... 415/211.1 |
| 4,545,726 | A | * | 10/1985 | Holliger ......................... 415/26 |
| 4,599,041 | A | * | 7/1986 | Stricker ........................ 415/130 |
| 4,958,986 | A | * | 9/1990 | Boussuges .................... 415/188 |
| 5,510,656 | A | * | 4/1996 | Wells .............................. 290/53 |
| 7,382,061 | B2 | * | 6/2008 | Ferraro .......................... 290/52 |
| 8,030,789 | B2 | * | 10/2011 | Ortiz .............................. 290/43 |
| 8,596,955 | B2 | * | 12/2013 | Freeman et al. .............. 415/3.1 |
| 2010/0209236 | A1 | * | 8/2010 | Freeman et al. ........... 415/208.1 |

FOREIGN PATENT DOCUMENTS

| | | |
|---|---|---|
| JP | 2008 095569 | 4/2008 |
| WO | WO 94/09272 | 4/1994 |
| WO | WO 2004/029418 | 4/2004 |

* cited by examiner

TURBINE WITH RADIAL INLET AND OUTLET ROTOR FOR USE IN BIDIRECTIONAL FLOWS

CROSS-REFERENCE TO RELATED APPLICATIONS

This application is a National Phase Application of PCT International Application No. PCT/PT2011/000003, International Filing Date Feb. 15, 2011, claiming priority of Portuguese Patent Application No. 104972, filed Feb. 19, 2010, which is hereby incorporated by reference.

The present invention relates to a turbine which can absorb energy from bi-directional reversing flows, as is the case of ocean wave energy converters.

The Technologies:

In the last few decades, a wide variety of systems have been proposed to extract energy from the sea waves, with various degrees of success.

An important class of such systems is characterized by the existence of a fixed or oscillating chamber open to the sea at its submerged part. Due to wave action, the water inside the structure is forced into motion. The resulting reciprocating relative motion and the associated forces may be converted into useful energy by means of a turbine. In some systems, known as oscillating water columns, there is an air-water interface at the top of the water column whose reciprocating motion alternately produces a compression and decompression of air which makes an air turbine to move. In another arrangement, the energy conversion can be made by a hydraulic turbine inside the water column or close to one of its ends. The (air or water) turbine drives (directly or indirectly) an electrical generator if the object is the production of electrical energy.

Due to the wavy nature of the sea surface motion, the turbine is required to absorb energy from a bi-directional flow, and so it must be self-rectifying, unless the device is equipped with a rectifying system made up of non-return valves, which has been found unpractical and costly.

Self-rectifying air turbines have been proposed and used in bi-directional flows for wave energy conversion. The Wells turbine is possibly the best known and most frequently used in bi-directional air flows. It is an axial-flow turbine. Its peak efficiency under stationary flow conditions may exceed 70%. However the range of flow rates within which the Wells turbine is capable of operating efficiently is relatively narrow, which results in modest time-averaged efficiencies under real irregular wave conditions. Besides, the Wells turbine is characterized by relatively large rotational speed and small torque, and also (because it is a reaction turbine) by a large axial force on its rotor. These characteristics may be inconvenient in wave energy applications.

The self-rectifying axial-flow impulse turbine is possibly the most frequently proposed alternative to the Wells turbine for wave energy applications. The axial-flow impulse turbine has been used since the final years of the nineteenth century as a steam turbine (the De Laval steam turbine). In the classical one-directional flow version, the fluid is accelerated and circumferentially deflected in a row of nozzles, and then is admitted into a rotor provided with blades. Here it is again deflected, its exit velocity being approximately in the axial direction. The rotor blades are shaped in such a way that the rotor inlet pressure is approximately equal to the exit pressure (which characterizes an impulse turbine). In bi-directional flow applications, the turbine should perform in the same way when the incoming flow direction is reversed. So, there should be two (not just one) rows of nozzles or guide vanes, one on each side of the rotor in such a way that the turbine (rotor and guide vanes) has a plane of symmetry perpendicular to its axis of rotation. A turbine with such an arrangement for wave energy applications is described in U.S. Pat. No. 3,922,739. As a consequence of the required symmetric arrangement, the fluid, after passing through the first row of guide vanes and the rotor, is admitted to the second row of guide vanes with an excessive angle of incidence. The misalignment between the guide blades of the second row and the incoming flow from the rotor gives rise to large aerodynamic (or hydrodynamic, in the case of water) losses, whose result is a relatively poor turbine efficiency. This problem may be (at least partially) overcome if the setting angle of the guide vanes, or the vane geometry, is adjustable, and is changed whenever the direction of the flow through the turbine is reversed. The practical implementation of this kind of control requires the turbine to be equipped with mechanisms that increase the construction and maintenance costs and reduce the reliability of the machine. This has hindered the use of guide vane control. An alternative method of reducing the aerodynamic (or hydrodynamic) losses by excessive incidence angle at the entrance to the second row of guide vanes consists in increasing the distance between the guide vane rows and the rotor blades, with the object of reducing the velocity (and hence the kinetic energy) of the flow at the entrance to the second row of guide vanes and in this way reduce the energy losses due to boundary layer separation (stalling) at those vanes. This methodology was proposed in Patent WO 2008/0112530. Here it is stated that the two rows of guide vanes, one on each side of the rotor, are offset from the rotor blades, radially as well as axially, with annular ducts connecting the guide vane sets with the rotor blade row. The radial offset allows, by conservation of angular momentum, the circumferential component of the flow velocity to be reduced at the entrance to the second row of guide vanes. This radial offset, eventually combined with an increase in the gap between the inner and outer walls of the annular ducts (i.e. an increase in blade span of the stator system), produces also a decrease in the meridian component (projected on an axial plane) of the flow velocity.

The present invention relates to a self-rectifying turbine consisting of a bladed rotor and two rows of guide vanes. The flow entrance to, and exit from, the rotor is radial, which means that the axial component of the inlet and outlet flow velocity component is relatively small. The inflow to the rotor is centripetal (i.e. in the direction of decreasing radial coordinate), and the outlet flow is centrifugal (i.e. in the direction of increasing radial coordinate). The stator has two rows of guide vanes circumferentially located around the rotor, but not axially offset from it as in Patent WO 2008/0112530. The flow between each of the openings in the rotor periphery and the corresponding row of guide vanes is essentially radial (the axial flow velocity is relatively small). The connection is provided by a duct formed by two walls of revolution about the rotational axis. One or both such walls may be shaped as flat discs perpendicular to the rotational axis.

With this arrangement, the turbine, made up of rotor and stator, has a compact configuration, especially on what concerns its axial extent. In particular, a flywheel, possibly of larger diameter than the turbine rotor itself, may be mounted on the same shaft as, and in the proximity of, the turbine rotor, which allows the shaft torque oscillations to be smoothed out.

DETAILED DESCRIPTION OF THE INVENTION

This invention concerns a turbine that, without change in its rotational direction, is capable of operating efficiently in bi-directional flow. For this reason, the turbine may be used in applications with reversing flow, as is the case of oscillating water column wave energy devices, or more generally in situations involving reciprocating flows, like in some renewable energy technologies or in other applications.

Figure 1:
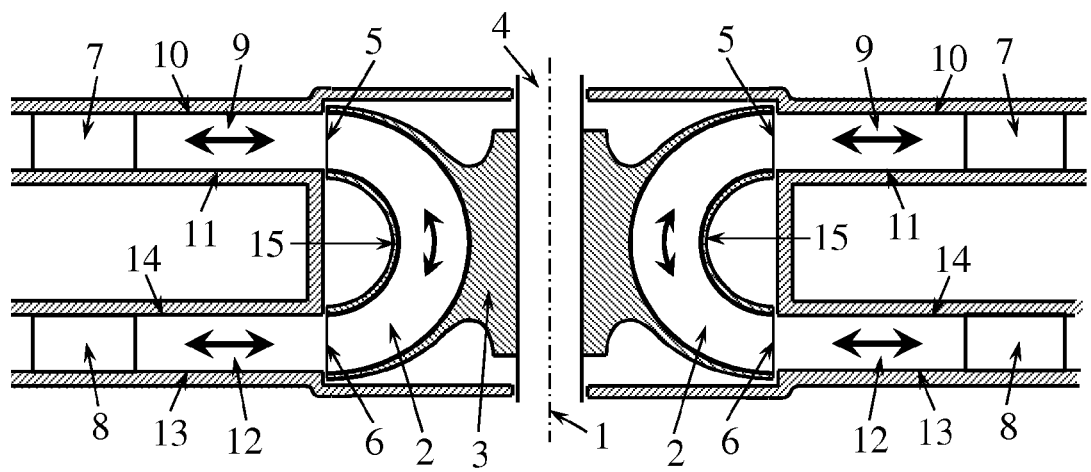
FIG. 1. Schematic representation of a cross section of the turbine by a plane containing the axis of rotation (1). The rotor blades (2) and the guide vanes (7, 8) are circumferentially projected onto the plane of the figure. The rotor comprises a set of blades (2) fixed to a hub (3) mounted on a shaft (4). The admission of fluid into, and exit from, the rotor takes place at (5) and (6), or vice-versa, depending on the direction of the reversing bi-directional flow through the turbine. The stator comprehends two rows of guide vanes (7) and (8), circumferentially disposed around the rotor, located in the radial alignment of the respective rotor openings (5) and (6). The connection between guide vane row (7) and rotor opening (5) is provided by a duct (9) with walls of revolution (10) and (11). One of these walls, or both, may be shaped as a flat disc. Identical description applies to connecting duct (12) and walls of revolution (13) and (14). (In the particular case of the figure, all these walls, (10), (11), (13) and (14), are represented as flat discs.) The ducts between rotor blades are bounded externally by a casing of revolution (15), which, in the arrangement of the figure, is rigidly connected to the rotor blades.

The turbine is schematically represented in FIG. 1, in a cross section by a plane containing the axis of rotation (1). The rotor blades (2) and the guide vanes (7, 8) are circumferentially projected onto the plane of the figure. The rotor comprehends a set of blades (2) fixed to a hub (3) mounted on a shaft (4). The admission of fluid into, and exit from, the rotor takes place at (5) and (6), or vice-versa, depending on the direction of the reciprocating bi-directional flow through the turbine. The stator comprehends two rows of guide vanes (7) and (8), circumferentially disposed around the rotor, located in the radial alignment of the respective rotor openings (5) and (6). The connection between guide vane row (7) and rotor opening (5) is provided by a duct (9) with walls of revolution (10) and (11). One of these walls, or both, may be shaped as a flat disc. Identical description applies to connecting duct (12) and walls of revolution (13) and (14). In the particular case of the figure, all these walls, (10), (11), (13) and (14), are represented as flat discs.

Figure 2:
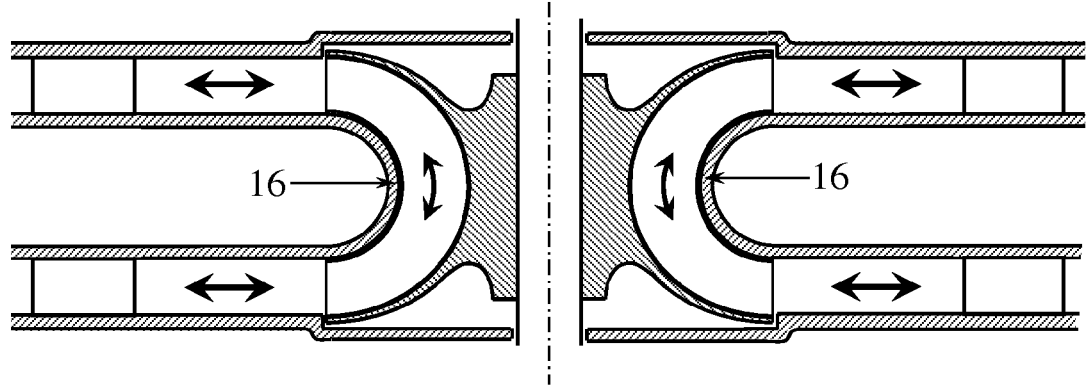
FIG. 2. Schematic representation identical to FIG. 1, except that the casing of revolution (16) that bounds the ducts between rotor blades is integrated into the stator.

The ducts between rotor blades (2) are bounded externally by a casing of revolution, which may be rigidly fixed to the rotor blades, as shown in (15), FIG. 1, or may be part of the stator, as represented in (16) in FIG. 2.

Figure 3A:
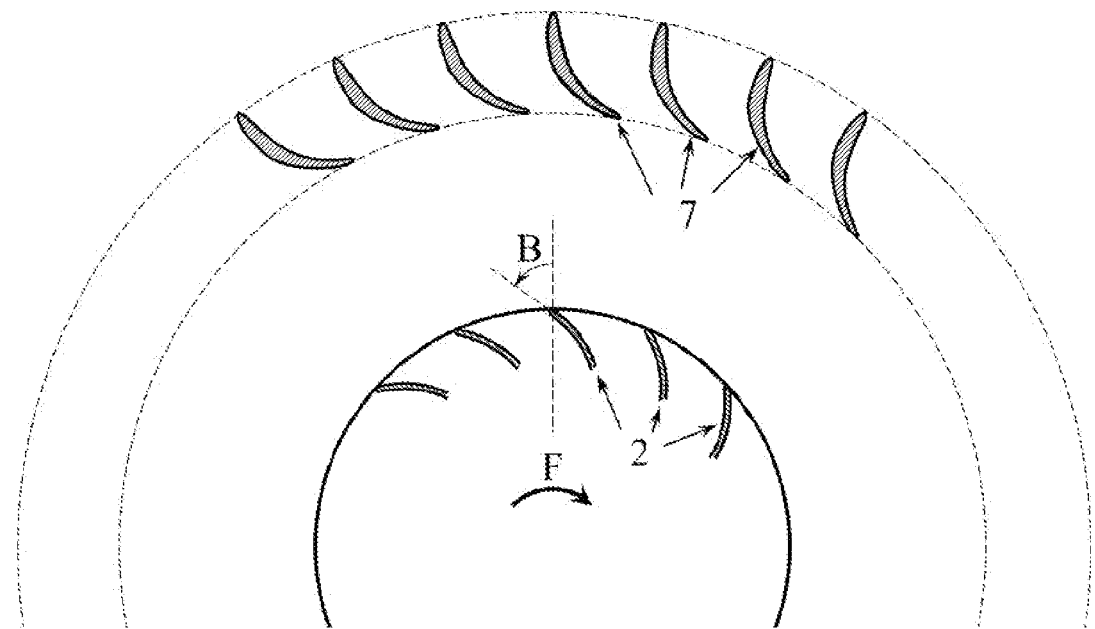
FIG. 3A. Schematic representation of a section of guide vanes (7) and a partial section of the rotor blades (2) by a plane perpendicular to the rotational axis. The stator blades (7) may be streamlined, as shown in the figure, or more simply made of bent plate. The guide vane curvature and setting angle are such that the incoming flow is deflected and forced to swirl in the same direction as the direction F of the rotor motion. The rotor blades, (2), close to their inlet/outlet edge, are inclined, with respect to a plane perpendicular to the rotational axis, by an angle B opposite to the direction F of the rotor motion.
Figure 3B:
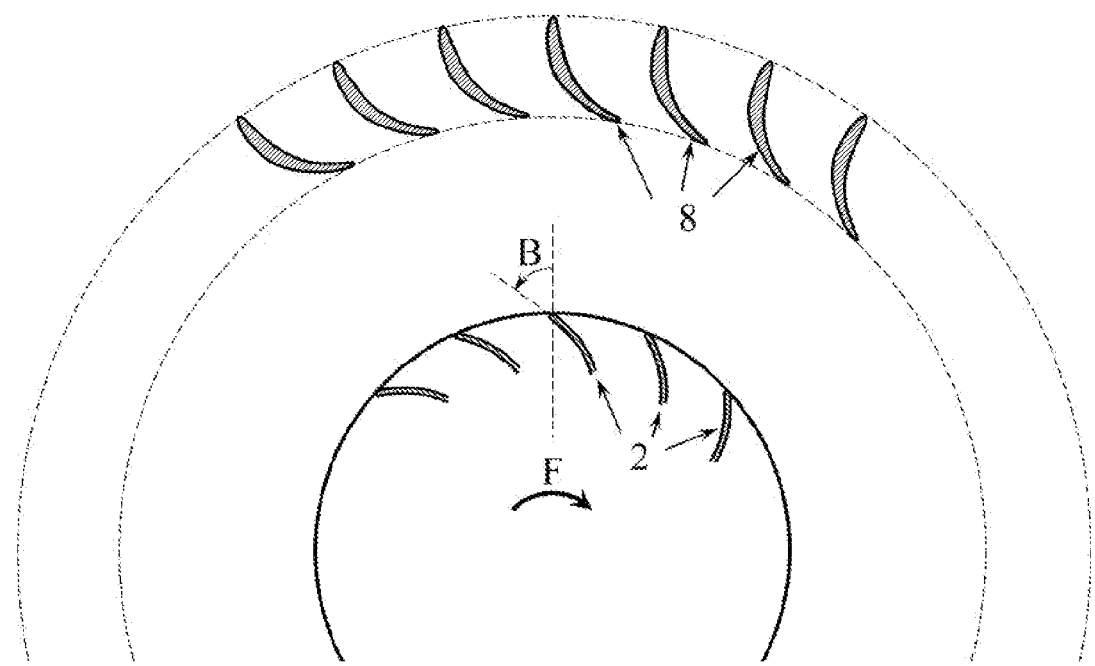
FIG 3B. Schematic representation of a section of guide vanes (8) and a partial section of the rotor blades (2) by a plane perpendicular to the rotational axis. The stator blades (8) may be streamlined, as shown in the figure, or may be more simply made of bent plate. The guide vane curvature and setting angle are such that the incoming flow is deflected and forced to swirl in the same direction as the direction F of the rotor motion. The rotor blades (2), close to their inlet/oulet edge, are inclined, with respect to a plane perpendicular to the rotational axis, by an angle B opposite to the cirection F of the rotor motion.

FIG. 3A,B schematically represents a section of one of the rows of guide vanes (7 or 8) and a partial section of the rotor blades (2) by a plane perpendicular to the rotational axis. The stator guide vanes (7) or (8) may be streamlined, as shown in FIG. 3A,B, or may be more simply made of curved plate. The guide vane curvature and setting angle are such that the incoming flow is deflected and made to swirl in the same direction as the direction F of the rotor motion. The rotor blades (2), close to their inlet/outlet edge, are inclined, with respect to a plane containing the axis of rotation, by an angle B opposite to the direction F of motion of the rotor.

Figure 4:
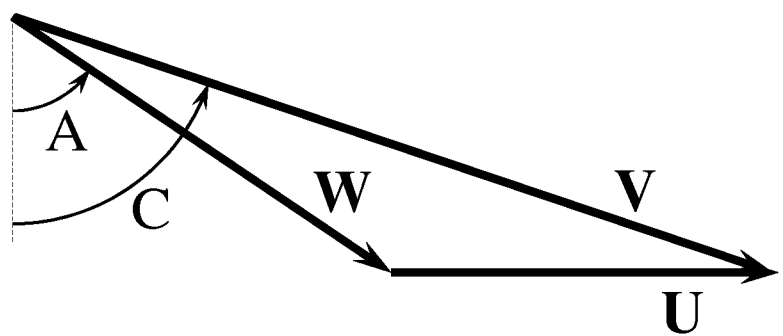
FIG. 4. Velocity diagram, at a given time, close to the rotor inlet. Vector U is the rotor peripheric velocity. Vector V is the averaged flow velocity in a fixed frame of reference, and makes an angle C with a plane containing the axis of rotation. Vector W is the relative flow velocity in a rotor-fixed frame of reference, and makes an angle A with a plane containing the axis of rotation.

FIG. 4 represents the velocity diagram, at a given time, close to the rotor inlet. Vector U is the rotor peripheric velocity and its modulus is equal to the product of the rotor outer radius and the rotational velocity in radians per unit time. Vector V is the averaged flow velocity in a fixed frame of reference. Angle C between velocity vector V and a plane containing the rotational axis depends essentially on the stator geometry, especially the geometry of the guide vane system and the geometry of the connecting duct with walls of revolution. The modulus of vector V depends on the flow rate through the turbine. Vector W is the relative flow velocity in a rotor-fixed frame of reference, and results from subtracting vector U from vector V. Angle A between the relative flow velocity vector W and a plane containing the axis of rotation depends on the V/U ratio between the modules of velocities V and U (i.e. depends on the ratio between the flow rate and the rotational speed), and also on the angle C of velocity V. Under conditions close to the peak (aerodynamic or hydrodynamic) efficiency of the turbine, the angle A of the relative flow velocity at rotor inlet should not be much different from angle B of the rotor blades themselves, in which situation the boundary layer separation at the rotor blades' leading edge is minimized. This condition implies that angle B of the rotor blades should be significantly smaller that angle C of velocity V. The same condition also defines a design relationship between, on the one hand, the nominal flow rate and the nominal rotational speed, and, on the other hand, the geometry of the guide vanes, the geometry of the connecting duct and the geometry of the rotor blades (especially the inlet angle of the rotor blades).

Figure 5:
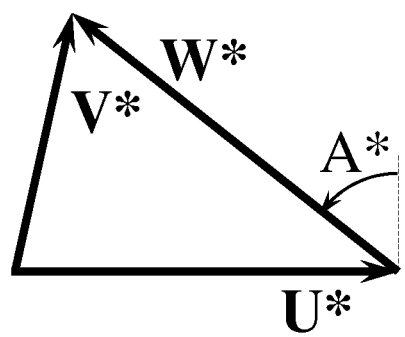
FIG. 5. Velocity diagram at the exit from the rotor at the same time as FIG. 4. The symbols are identical to those of FIG. 4, with an asterisk for distinction. Vector U* is the rotor peripheric velocity. Vector V* is the averaged flow velocity in a fixed frame of reference. Vector W* is the relative flow velocity in a rotor-fixed frame of reference and makes an angle A* with a plane containing the rotational axis.

FIG. 5 represents, at the same time as FIG. 4, the velocity diagram at the exit from the rotor. The symbols are identical to those of FIG. 4, with an asterisk for distinction. Assuming that the rotor blades, by their appropriate shape and number, efficiently guide and deflect the relative flow inside the rotor, the angle $A^*$, between the relative flow velocity at rotor exit and a plane containing the rotational axis, is approximately equal to the angle $B^*$ of the blades at rotor exit. If the flow rate through the turbine is steady or quasi steady, the power P absorbed by the rotor may be calculated by Euler turbine equation as $$P = M(U^* W^* \sin A^* + UW \sin A),$$

where M is the mass flow rate. This equation shows that angles A and $A^*$ should conveniently be positive and not small. Typically, they could range between 30 and 60 degrees.

If the guide vanes are radially offset from the rotor, the flow velocity at the inlet to the second row of guide vanes is reduced, and in this way the losses due to excessive incidence are also lowered.

Figure 6:
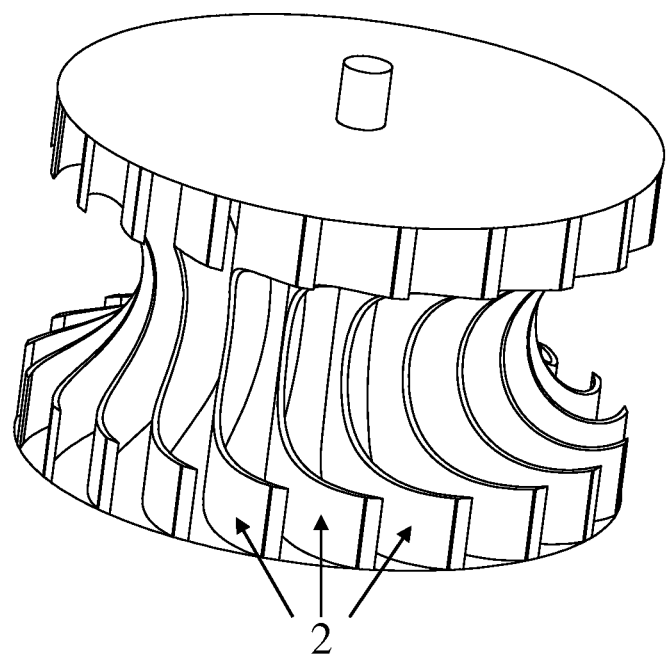
FIG. 6. Schematic representation of the bladed rotor in perspective, without outer casing as in FIG. 2.

FIG. 6 schematically represents, in perspective, the rotor blades (2). These blades should meet the specified inlet and outlet angles. Their number and geometry should allow the relative flow to be adequately guided throughout the rotor. The rotor blades can be of constant or variable thickness, and their edges can be rounded, depending on aerodynamic or hydrodynamic considerations and on fabrication convenience.

Figure 9:
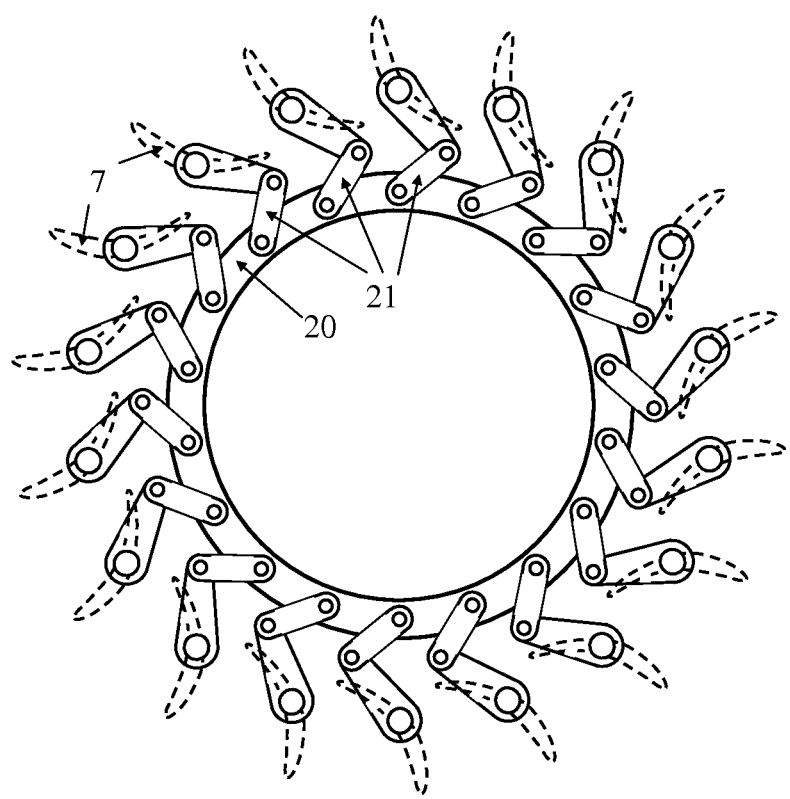
FIG. 9. Schematic representation of pivoting guide vanes (7) by means of a mechanism consisting of a ring (20) and articulated rods (21).

In the simplest arrangement, the guide vanes are fixed. In an alternative more versatile (although more costly and less reliable) arrangement, the setting angle of the guide vanes can be adjusted to match the variations in direction and magnitude of the reversing flow rate. This is done jointly for all the guide vanes of each row, by means of a mechanism possibly consisting of a ring (20) and articulated rods (21), as shown schematically in FIG. 9, acted upon by a servomotor, as in the wicket gate system of the conventional Francis and Kaplan hydraulic turbines.

Figure 7:
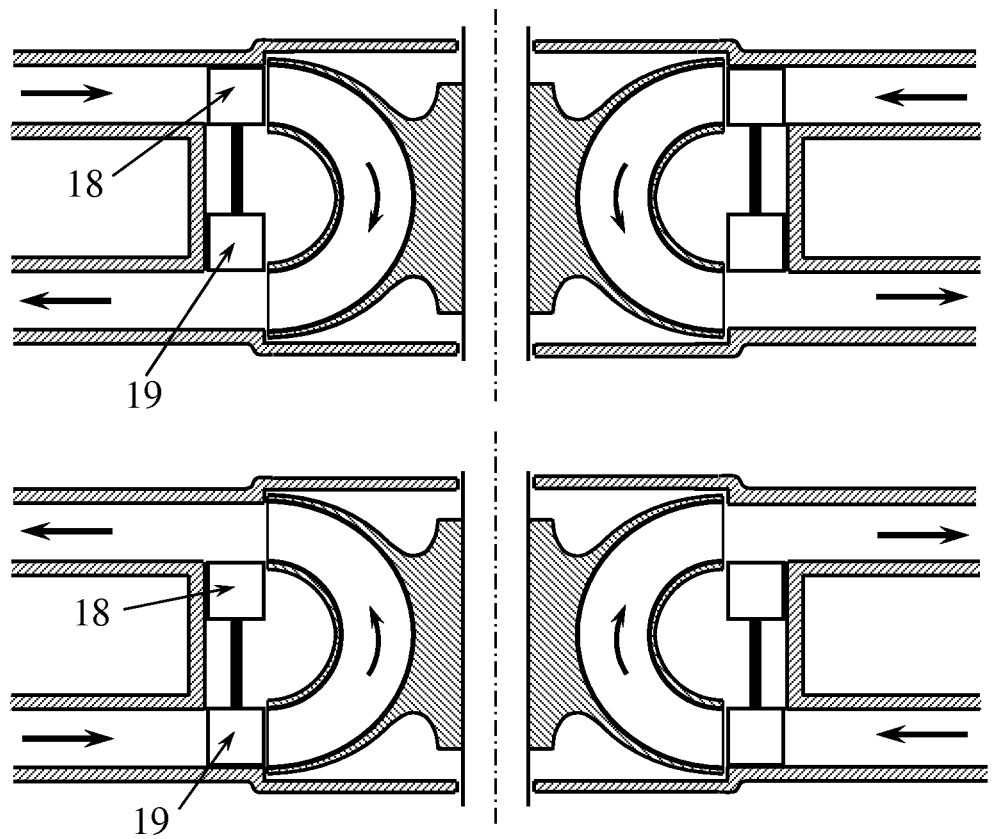
FIG. 7. Schematic representation of the turbine, with rotor as in FIG. 1, but with two rows of guide vanes (18,19) that can slide axially, in such a way that each guide vane row can be inserted into, or removed from, the flow space, depending on the reversing flow direction. The figure represents the preferred arrangement, in which the two guide vane rows (18,19) are fixed to each other, so that, whenever one of the rows is inserted into the flow space, the other one is removed from it.
Figure 8:
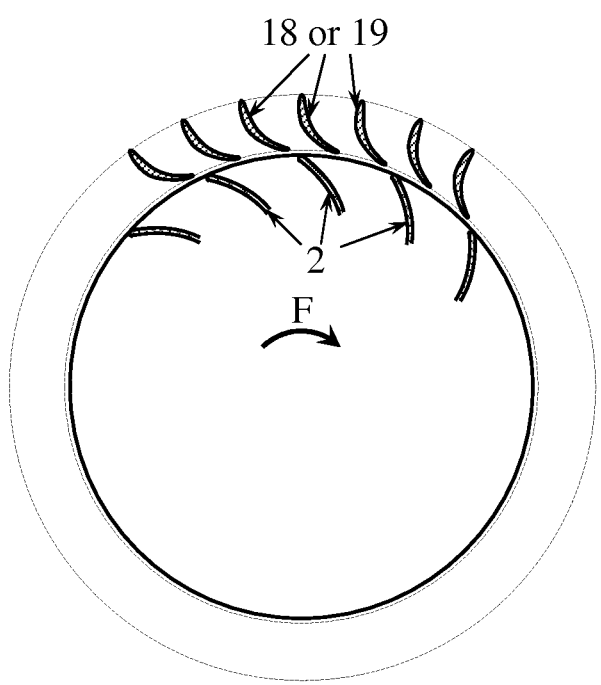
FIG. 8. Representation, as in FIG. 3A and B, of a partial section of one guide vane row and the rotor blades by a plane perpendicular to the rotational axis, corresponding to the arrangement shown in FIG. 7. In this arrangement, the radial gap between the rotor and the guide vanes is small, and the guide vane row can move axially. The figure represents the situation when the fluid is flowing into the rotor, because, in principle, the guide vanes should be removed from the flow space where the fluid is flowing out of the rotor.

An alternative way of avoiding the losses due to excessive incidence at the inlet to the second row of guide vanes is simply to remove those vanes from the flow space. This can be done by axial translation of the two rows of guide vanes in such a way that each row can be inserted into, or removed from, the flow space, depending on the direction of the reversing flow. In a preferred arrangement, the two rows of guide vanes ((18) and (19) in FIG. 7) are rigidly connected to each other and, when one of them is inside the flow space, the other one is out of it. The axial motion should be controlled in such a way that it is completed in a short period of time, whenever the direction of the flow is reversed. As far as possible, the fluid should pass through a row of guide vanes before entering the rotor, but not after coming out of it. Due to the reversing nature of the flow, each of the two rows of guide vanes is successively inserted into, and removed from, the flow space. Because in this arrangement no losses due to stalling occur at the second row of guide vanes, there is no advantage in radially offsetting the guide vanes away from the rotor. So, the radial gap between the rotor and the guide vanes should preferably be small, as schematically represented in FIGS. 7 and 8. The axial translational motion of the guide vane set can be produced by hydraulic, pneumatic, electrical or other action, or by gravity if the axis of rotation is sufficiently inclined with respect to the horizontal plane.

The set consisting of the rotor blades, guide vane rows and connecting ducts may be symmetrical with respect to a plane perpendicular to the axis of rotation, in which case it is $U = U^*$ and $B = B^*$. However, in other realizations, it could be otherwise, or only partial symmetry to occur, for better adequacy to different flow conditions in the two flow directions, possibly due to the asymmetry between crests and troughs of non-small amplitude waves, or to air density differences between the pneumatic chamber of the oscillating water column and the outside atmosphere.

The invention claimed is:

1. A turbine arrangement for bi-directional reversing flow comprising:
   a rotor with blades disposed circumferentially around said rotor,
   a stator with guide vanes;
   an axis, said rotor rotatably mounted about the axis;
   said blades forming flow channels from rotor entry to rotor exit, said rotor having on its outer periphery two apertures axially offset from each other;
   a first set of said guide vanes having a setting angle and being circumferentially disposed about the axis and located at a greater radius with respect to the corresponding rotor aperture in the path of the flow incoming to it or coming out of it;
   a first duct connecting the first set of guide vanes with the corresponding rotor aperture;
   a second set of said guide vanes having a setting angle and being circumferentially disposed about the axis and located at a greater radius with respect to the corresponding rotor aperture in the path of the flow incoming to it or coming out of it;
   a second duct connecting the second set of guide vanes with the corresponding rotor aperture, wherein the entrance of fluid into the rotor through any of the two apertures is centripetal with a swirl imparted by the first set of guide vanes in the same direction as the normal direction of rotation of the rotor, and
   wherein the exit of fluid from the rotor through any of the two apertures is centrifugal, said rotor blades in the vicinity of each of the two rotor apertures being inclined, in relation to an axial plane, at an angle of direction opposite a normal direction of rotation of the rotor.

2. The turbine arrangement according to claim 1 wherein said first duct is externally disposed in the alignment of the first set of guide vanes and connects it to an outside fluid space.

3. The turbine arrangement according to claim 1 wherein said second duct is externally disposed in the alignment of the second set of guide vanes and connects it to an outside fluid space.

4. The turbine arrangement according to claim 1 wherein the two sets of guide vanes of the stator are movable in axial translation, in such a way that each guide vane set can be inserted into the flow incoming to the rotor and be removed from the flow coming out of the rotor.

5. The turbine according to claim 1 wherein, in the stator, the setting angle of the guide vanes of each set is adjustable and is controlled by a mechanism of ring and articulated rods as commonly applied in the wicket gate system of Francis and Kaplan hydraulic turbines.

6. The turbine according to claim 1 wherein the channels formed by the rotor blades are externally bound along the whole periphery:
   by a casing rigidly connected to the rotor blades,
   or by a casing forming part of the stator.

7. A turbine arrangement for bi-directional reversing flow comprising:
   a rotor with blades disposed circumferentially around said rotor;
   a stator with guide vanes;
   an axis, said rotor rotatably mounted about the axis;
   said blades forming flow channels from rotor entry to rotor exit, said rotor having on its outer periphery two apertures axially offset from each other, the entrance of fluid into the rotor through any of the two apertures being centripetal and the exit of fluid from the rotor through any of the two apertures being centrifugal;
   a first set of said guide vanes having a setting angle and being circumferentially disposed about the axis and located at a greater radius with respect to the corresponding rotor aperture in the path of the flow incoming to it or coming out of it;
   a first duct connecting the first set of guide vanes internally with the corresponding rotor aperture and externally with an outer fluid space, wherein said first duct is externally disposed in the alignment of the first set of guide vanes and connects it to an outside fluid space;
   a second set of said guide vanes having a setting angle and being circumferentially disposed about the axis and located at a greater radius with respect to the corresponding rotor aperture in the path of the flow incoming to it or coming out of it;
   a second duct connecting the second set of guide vanes internally with the corresponding rotor aperture and externally with an outside fluid space, wherein said second duct is externally disposed in the alignment of the second set of guide vanes and connects it to an outside fluid space;
   wherein the two sets of guide vanes of the stator are movable in axial translation in such a way that each guide vane set can be inserted into the flow incoming to the rotor and be removed from the flow coming out of the rotor.

8. The turbine according to claim 7 wherein, in the stator, the setting angle of the guide vanes of each set is adjustable.

9. The turbine according to claim 7 wherein the channels formed by the rotor blades are externally bound along the whole periphery by a casing rigidly connected to the rotor blades or by a casing forming part of the stator.

10. A turbine arrangement for bi-directional reversing flow comprising:
   a rotor with blades disposed circumferentially around said rotor,
   a stator with guide vanes;
   an axis, said rotor rotatably mounted about the axis;
   said blades forming flow channels from rotor entry to rotor exit, said rotor having on its outer periphery two apertures axially offset from each other,
   a first set of said guide vanes having a setting angle and being circumferentially disposed about the axis and located at a greater radius with respect to the corresponding rotor aperture in the path of the flow incoming to it or coming out of it;
   a first duct connecting the first set of guide vanes internally with the corresponding rotor aperture and externally with an outer fluid space, wherein said first duct is externally disposed in the alignment of the first set of guide vanes and connects it to an outside fluid space;
   a second set of said guide vanes having a setting angle and being circumferentially disposed about the axis and located at a greater radius with respect to the corresponding rotor aperture in the path of the flow incoming to it or coming out of it;
   a second duct connecting the second set of guide vanes internally with the corresponding rotor aperture and externally with an outside fluid space, wherein said second duct is externally disposed in the alignment of the second set of guide vanes and connects it to an outside fluid space;
   a casing that bounds externally the channels formed by the rotor blades along the whole periphery that is either a casing rigidly connected to the rotor blades or is a casing forming part of the stator, wherein the entrance of fluid into the rotor through any of the two apertures is centripetal with a swirl imparted by the first set of guide vanes in the same direction as the normal direction of rotation of the rotor, and
   wherein the exit of fluid from the rotor through any of the two apertures is centrifugal, said rotor blades in the vicinity of each of the two rotor apertures being inclined, in relation to an axial plane, at an angle of direction opposite a normal direction of rotation of the rotor.

11. The turbine arrangement according to claim 10 wherein the two sets of guide vanes of the stator, are movable in axial translation, in such a way that each guide vane set can be inserted into the flow incoming to the rotor and be removed from the flow coming out of the rotor.

12. The turbine according to claim 10 wherein, in the stator, the setting angle of the guide vanes of each set is adjustable.

* * * * *